United States Patent
Park et al.

(10) Patent No.: US 11,037,472 B2
(45) Date of Patent: Jun. 15, 2021

(54) ROLLABLE DISPLAY DEVICE

(71) Applicant: LG Display Co., Ltd., Seoul (KR)

(72) Inventors: Geunchang Park, Goyang-si (KR);
Chounsung Kang, Goyang-si (KR);
Jungkyu Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/778,592

(22) Filed: Jan. 31, 2020

(65) Prior Publication Data

US 2020/0168131 A1 May 28, 2020

Related U.S. Application Data

(63) Continuation of application No. 15/794,288, filed on Oct. 26, 2017, now Pat. No. 10,586,475.

(51) Int. Cl.
*G09F 9/30* (2006.01)
*G09G 3/3233* (2016.01)
*G06F 1/16* (2006.01)

(52) U.S. Cl.
CPC ............ *G09F 9/301* (2013.01); *G06F 1/1652* (2013.01); *G09G 3/3233* (2013.01); *G09G 2310/0264* (2013.01)

(58) Field of Classification Search
CPC ..... G09F 9/301; G06F 1/1652; G09G 3/3233; G09G 2310/0264; G09G 3/20; G09G 3/3208
See application file for complete search history.

(56) References Cited

U.S. PATENT DOCUMENTS

| | | | |
|---|---|---|---|
| 9,098,241 B1 | 8/2015 | Cho et al. | |
| 2011/0132557 A1* | 6/2011 | Kuroi | G03B 21/58 160/368.1 |
| 2012/0200915 A1* | 8/2012 | Kuroi | G03B 21/58 359/443 |

(Continued)

FOREIGN PATENT DOCUMENTS

| | | |
|---|---|---|
| CN | 2467363 Y | 12/2001 |
| CN | 1926595 A | 3/2007 |

(Continued)

OTHER PUBLICATIONS

Extended European Search Report dated Mar. 21, 2018 for the European patent application No. 17198465.1.

(Continued)

*Primary Examiner* — Rockshana D Chowdhury
(74) *Attorney, Agent, or Firm* — Polsinelli PC

(57) ABSTRACT

A rollable display device is disclosed. The rollable display device includes a display panel, a driving unit including a motion converting unit configured to linearly move in a width direction of the display panel in conjunction with a rotational motion of a motor, a lifting unit connected to one end of the display panel and the motion converting unit, and configured to move up and down the display panel in a longitudinal direction of the display panel in conjunction with a linear motion of the motion converting unit, and a panel roller unit connected to other end of the display panel, and configured to roll and unroll the display panel along a periphery of the panel roller unit in conjunction with moving up and down of the display panel.

17 Claims, 20 Drawing Sheets

(56) References Cited

U.S. PATENT DOCUMENTS

| | | | | |
|---|---|---|---|---|
| 2012/0204453 A1* | 8/2012 | Jung | ................. | G09F 9/301 |
| | | | | 40/517 |
| 2014/0092566 A1* | 4/2014 | Shirasaka | ............ | H05K 5/0017 |
| | | | | 361/749 |
| 2014/0211399 A1* | 7/2014 | O'Brien | ................ | G06F 1/1652 |
| | | | | 361/679.26 |
| 2014/0268532 A1* | 9/2014 | Nicol | ..................... | G09F 9/301 |
| | | | | 361/679.26 |
| 2016/0324021 A1* | 11/2016 | Takayanagi | ........... | G06F 1/1652 |

FOREIGN PATENT DOCUMENTS

| | | | |
|---|---|---|---|
| CN | 102103317 A | 6/2011 | |
| CN | 103069473 A | 4/2013 | |
| CN | 103375962 A | 10/2013 | |
| CN | 105280668 A | 1/2016 | |
| JP | I-104-237033 A | 8/1992 | |
| JP | 2010-078684 A | 4/2010 | |
| JP | 5245677 B2 | 7/2013 | |

OTHER PUBLICATIONS

Office Action issued by the China National Intellectual Property Administration dated Jun. 24, 2019 in co-pending Chinese Patent Application No. 201711008889.8.

Chinese Office Action dated Aug. 14, 2020 issued in corresponding Patent Application No. 201711008889.8 w/English Translation (24 pages).

* cited by examiner

FIG. 4B
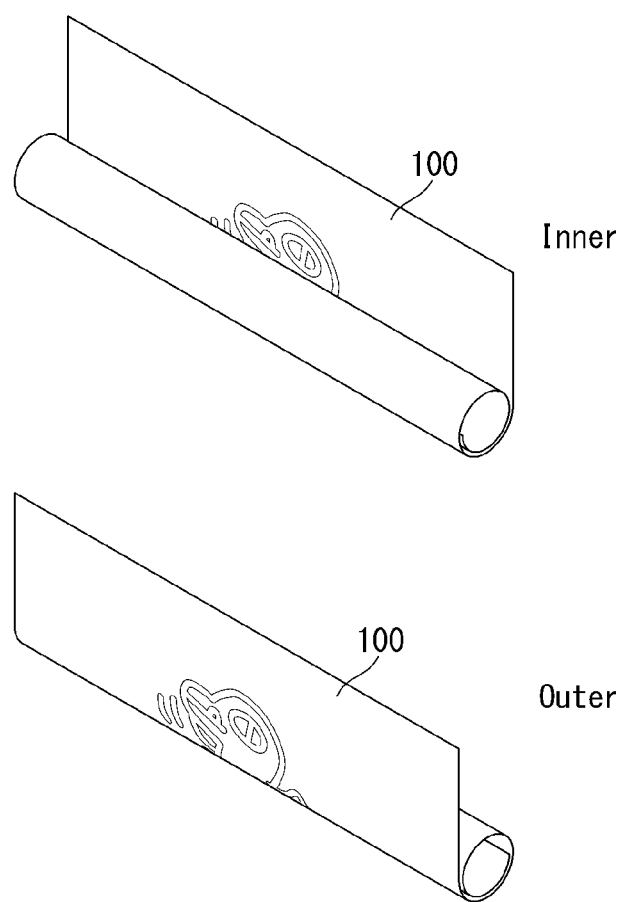

ROLLABLE DISPLAY DEVICE

CROSS REFERENCE TO RELATED APPLICATIONS

This application is a continuation of U.S. patent application Ser. No. 15/794,288 filed on Oct. 26, 2017, which claims the priority benefit of Korean Patent Application No. 10-2016-0140353 filed on Oct. 26, 2016, all of which are hereby incorporated by reference in their entirety as if fully set forth herein.

BACKGROUND

Field of the Disclosure

The present disclosure relates to a display device, and more particularly, to a rollable display device.

Description of the Background

With the advancement of information technologies, the demands for display devices which enable a user to access information have increased. Accordingly, various types of the display devices are widely used, such as an electroluminescent display, a liquid crystal display (LCD), and a plasma display panel (PDP).

Since the electroluminescent display is a self-light emitting device, power consumption is lower than that of a liquid crystal display device requiring a backlight, and the electroluminescent display can be made thinner than the liquid crystal display device. In addition, the electroluminescent display has a wide viewing angle and a high response speed. The electroluminescent display is expanding the market while competing with the liquid crystal display device by developing process technology up to the level of large-screen mass production technology.

Pixels of the electroluminescent display include organic light emitting diodes (OLEDs) which are self light emitting elements. The electroluminescent display may be divided depending on kinds of light emitting materials, light emitting methods, light emitting structures, driving methods, and the like. Accordingly, the electroluminescent display may be divided into a fluorescent emission and a phosphorescent emission depending on a light emitting method and may be divided into a top emission structure and a bottom emission structure depending on a light emitting structure. In addition, the electroluminescent display may be divided into a passive matrix OLED (PMOLED) and an active matrix OLED (AMOLED) depending on a driving method.

Recently, a flexible display device has been commercialized. The flexible display device can reproduce input images on a screen of a display panel on which a plastic OLED is formed. The plastic OLED is formed on a flexible plastic substrate. The flexible display device can be implemented in various designs, and has advantages in portability and durability. The flexible display device can be implemented in various forms such as a bendable display device, a foldable display device, and a rollable display device. Such a flexible display device can be applied not only to a mobile device such as a smart phone and a tablet PC but also to a television (TV), an automobile display, and a wearable device, and the application field thereof is expanding.

A display panel of the rollable display device can be rolled or unrolled as needed. When a user desires to use the rollable display device, the display panel needs to be kept unrolled. Since a conventional rollable display device does not include a fixture for holding the display panel in the unrolled state, unlike the user's desire, the display panel can return to be the rolled state during the using. The absence of the fixture can degrade usability of the user and is problematic.

SUMMARY

Accordingly, the present disclosure is to provide a rollable display device including a structure capable of facilitating an operation of rolling and unrolling a display panel and capable of supporting the display panel.

In one aspect, a rollable display device comprises a display panel; a driving unit including a motion converting unit configured to linearly move in a width direction of the display panel in conjunction with a rotational motion of a motor; a lifting unit connected to one end of the display panel and the motion converting unit, and configured to move up and down the display panel in a longitudinal direction of the display panel in conjunction with a linear motion of the motion converting unit; and a panel roller unit connected to other end of the display panel, wherein the display panel is unrolled and rolled along a periphery of the panel roller unit corresponding to moving up and down of the display panel.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principles of the disclosure.

In the drawings:

FIGS. 4A and 4B are views illustrating an example of use of a rollable display device according to an aspect of the disclosure;

DETAILED DESCRIPTION OF THE ASPECTS

Reference will now be made in detail to aspects of the disclosure, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the aspects of the disclosure. In describing various aspects, the same components may be described at the outset and may be omitted in other aspects.

The terms "first", "second", etc. may be used to describe various components, but the components are not limited by the terms. The terms are used only for the purpose of distinguishing one component from other components.

A display device according to an aspect of the disclosure may be implemented based on a display device such as a liquid crystal display (LCD), a field emission display (FED), a plasma display panel (PDP), an electroluminescent display, an electrophoresis display (EPD), a quantum dot display (QDD), or the like. Hereinafter, for convenience of explanation, a rollable display device including an organic light emitting diode (hereinafter, referred to as OLED) will be described as an example.

Figure 1:
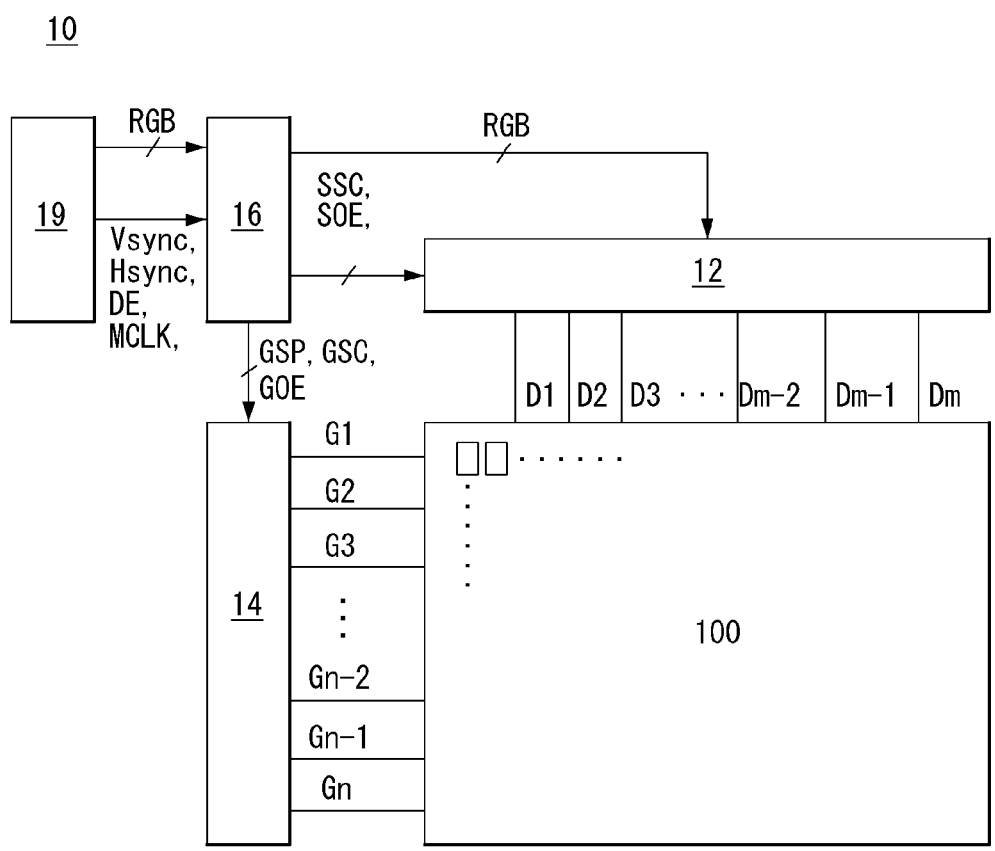
FIG. 1 is a schematic view of a rollable display device according to an aspect of the present disclosure.
Figure 2:
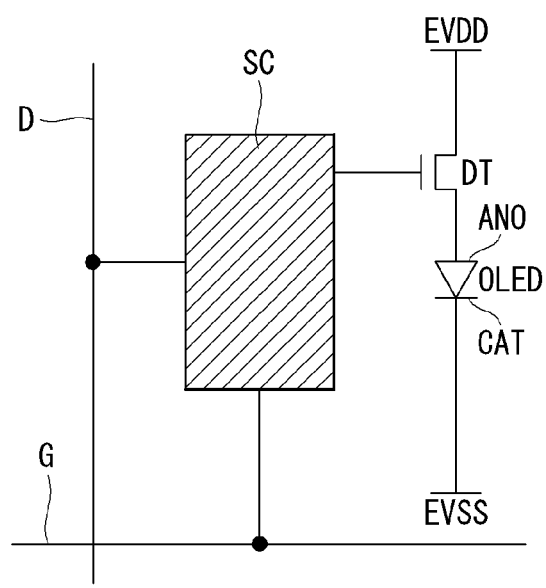
FIG. 2 is a schematic view of a pixel shown in FIG. 1.
Figure 3:
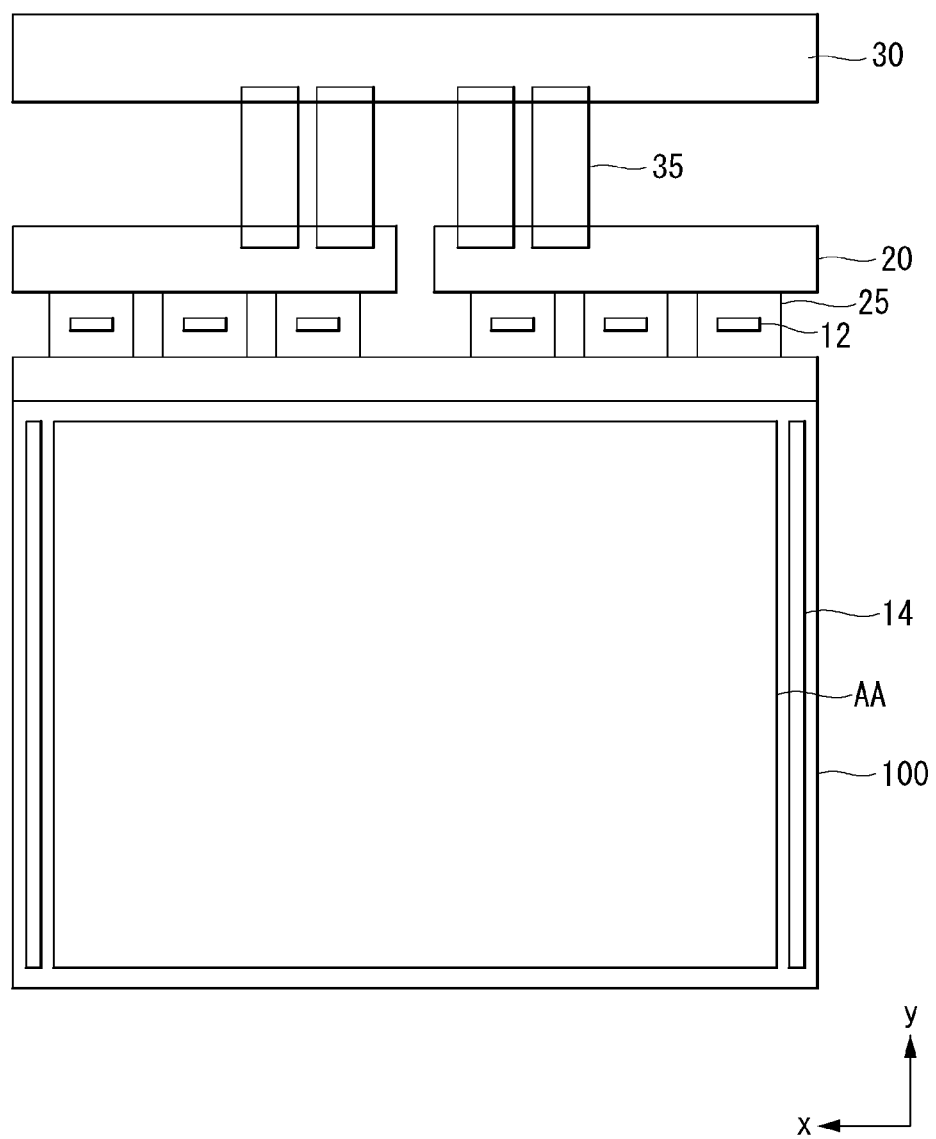
FIG. 3 is a view illustrating a structure of a modular display panel.

FIG. 1 is a schematic view of a rollable display device according to an aspect of the disclosure. FIG. 2 is a schematic view of a pixel shown in FIG. 1. FIG. 3 is a view illustrating a structure of a modular display panel.

Referring to FIG. 1, a rollable display device 10 according to an aspect of the disclosure includes a display driving circuit and a display panel 100.

The display driving circuit includes a data driver 12, a gate driver 14, and a timing controller 16, and writes a video data voltage of an input image to pixels of the display panel 100. The data driver 12 converts digital video data RGB input from the timing controller 16 into an analog gamma compensation voltage to generate a data voltage. The data voltage output from the data driver 12 is supplied to data lines D1 to Dm. The gate driver 14 sequentially supplies a gate signal synchronized with the data voltage to gate lines G1 to Gn to select the pixels of the display panel 100 to which the data voltage is written.

The timing controller 16 receives a timing signal such as a vertical synchronizing signal Vsync, a horizontal synchronizing signal Hsync, a data enable signal DE and a main clock MCLK, and the like input from a host system 19, and synchronizes operation timing of the data driver 12 and the gate driver 14. Data timing control signal for controlling the data driver 12 includes a source sampling clock SSC, a source output enable signal SOE, and the like. Gate timing control signal for controlling the gate driver 14 includes a gate start pulse GSP, a gate shift clock GSC, a gate output enable signal GOE, and the like.

The host system 19 may be implemented as one of a television system, a set-top box, a navigation system, a DVD player, a Blu-ray player, a personal computer (PC), a home theater system, and a phone system. The host system 19 includes a system on chip (SoC) with an embedded scaler to convert the digital video data RGB of the input image into a format suitable for displaying on the display panel 100. The host system 19 transmits the timing signals Vsync, Hsync, DE, and MCLK together with the digital video data RGB to the timing controller 16.

A pixel array of the display panel 100 includes pixels defined by the data lines (D1 to Dm, where m is a positive integer) and the gate lines (G1 to Gn, where n is a positive integer). Each of the pixels includes an OLED which is a self-light emitting element.

Referring further to FIG. 2, in the display panel 100, a plurality of data lines D and a plurality of gate lines G intersect, and pixels are arranged in a matrix form in each of the intersecting regions. Each of the pixels includes an OLED, a driving thin film transistor (hereinafter, referred to as TFT) DT for controlling an amount of current flowing through the OLED, and a programming unit SC for setting a gate-source voltage of the driving TFT DT.

The programming unit SC may include at least one switching TFT and at least one storage capacitor. The switching TFT is turned on in response to a gate signal from the gate line G to apply a data voltage from the data line D to one electrode of the storage capacitor. The driving TFT DT controls the amount of current supplied to the OLED depending on a magnitude of a voltage charged in the storage capacitor to control an amount of light emitted from the OLED. The amount of light emitted from the OLED is proportional to the amount of current supplied from the driving TFT DT. Each of the pixels is connected to a high potential power source EVDD and a low potential power source EVSS, and are supplied with a high potential power supply voltage and a low potential power supply voltage from a power generator (not shown). TFTs constituting a pixel may be implemented as a p-type or an n-type. In addition, a semiconductor layer of the TFTs constituting the pixel may include amorphous silicon, polysilicon, or an oxide. The OLED includes an anode electrode ANO, a cathode electrode CAT, and an organic compound layer interposed between the anode electrode ANO and the cathode electrode CAT. The anode electrode ANO is connected to the driving TFT DT.

Referring further to FIG. 3, the display panel 100 is electrically connected to the timing controller 16 shown in FIG. 1, the data driver 12, the gate driver 14, and the like (the host system 19 shown in FIG. 1 and the power generator not shown), and is modularized.

The gate driver 14 may be formed on the display panel 100 by a gate in panel (GIP) manner. That is, the gate driver 14 may be formed in a GIP manner on left, right, or both left and right sides of a display area AA, so that the display panel 100 can be easily rolled and unrolled. However, the aspect of the disclosure is not limited thereto.

A data printed circuit board (PCB) 20 is electrically connected to the display panel 100 through a first connection member 25. The first connection member 25 may be a chip on film (COF) on which the data driver 12 is mounted, but is not limited thereto. For example, the first connection member 25 may be implemented by a tape carrier package (TCP) manner to electrically connect the data PCB 20 and the display panel 100.

The data PCB 20 is connected to a control board 30 through a second connection member 35. The second connection members 35 may be plural. The timing controller 16 and the like are mounted on the control board 30. The second connection member 35 may be a flexible flat cable (FFC), but is not limited thereto. The control board 30 may be connected to the host system 19 shown in FIG. 1, the power generator, and the like through a connection cable.

Figure 4A:
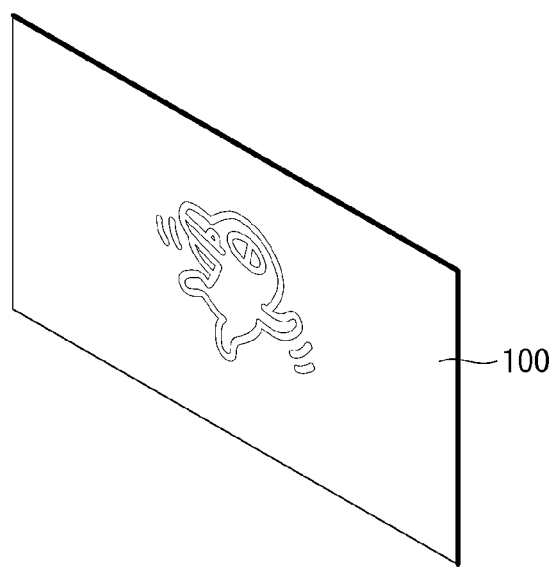

FIGS. 4A and 4B are views illustrating an example of use of a rollable display device according to an aspect of the disclosure.

Referring to FIGS. 4A and 4B, a display panel 100 includes a display area in which an input image is reproduced. A user can recognize information output from the display panel 100 through the display area. A front surface of the display panel 100 refers to one surface of the display panel 100 in which the display area is defined. Conversely, a back surface of the display panel 100 refers to one surface of the display panel 100, in a direction opposite to the front surface thereof, in which the user can not recognize the display area. However, the present disclosure is not limited thereto. If necessary, the display area can also be defined on the back surface of the display panel 100.

The display panel 100 may be rolled and unrolled. That is, the display panel 100 may be easily and repeatedly subjected to rolling (or winding) operations or unrolling (or unwinding) operations by being given a predetermined flexibility. As shown in FIG. 4B, the display panel 100 may be rolled (Inner rolling) in a front surface direction of the display panel 100 and may be rolled (Outer rolling) in a back surface direction of the display panel 100. Hereinafter, for convenience of explanation, an instance of that the display panel 100 is rolled in the back surface direction will be described as an example, unless otherwise specified.

Figure 5:
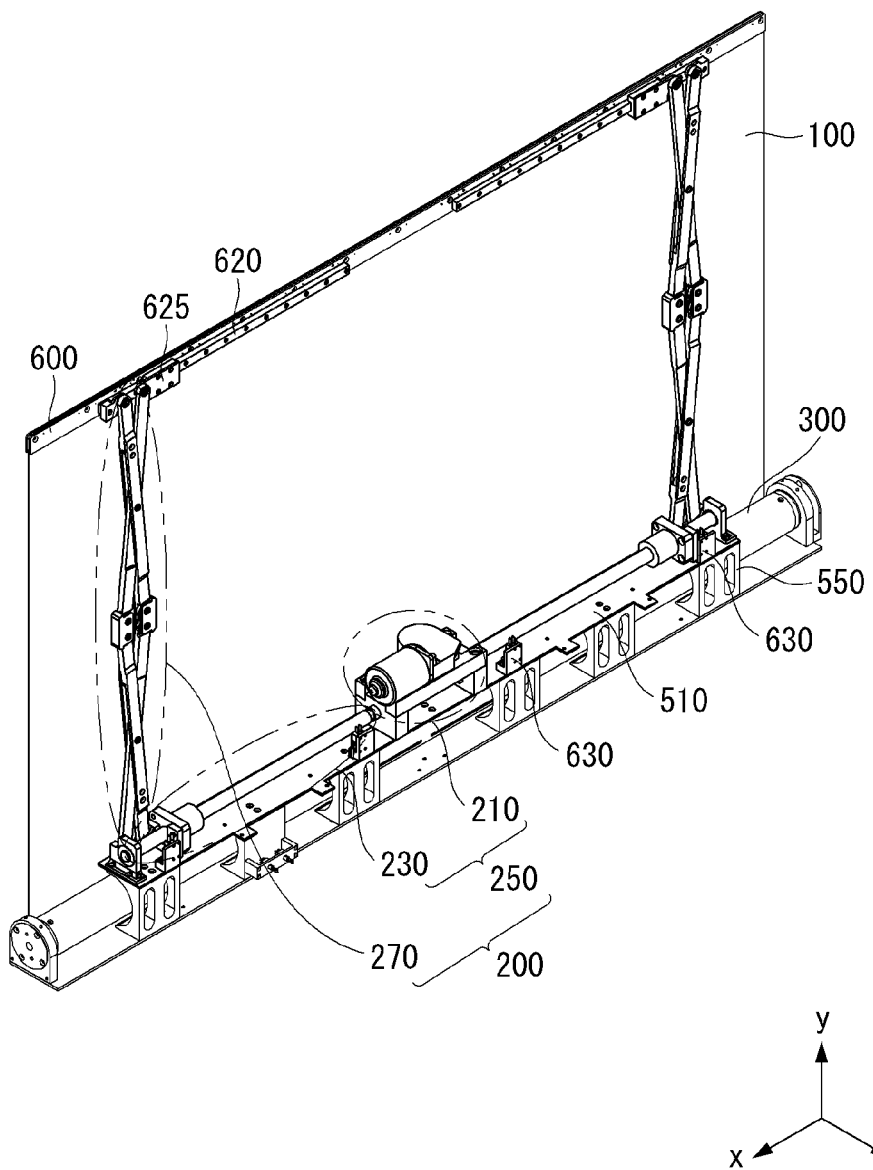
FIG. 5 is a perspective view illustrating a rollable display device according to an aspect of the disclosure.
Figure 6A:
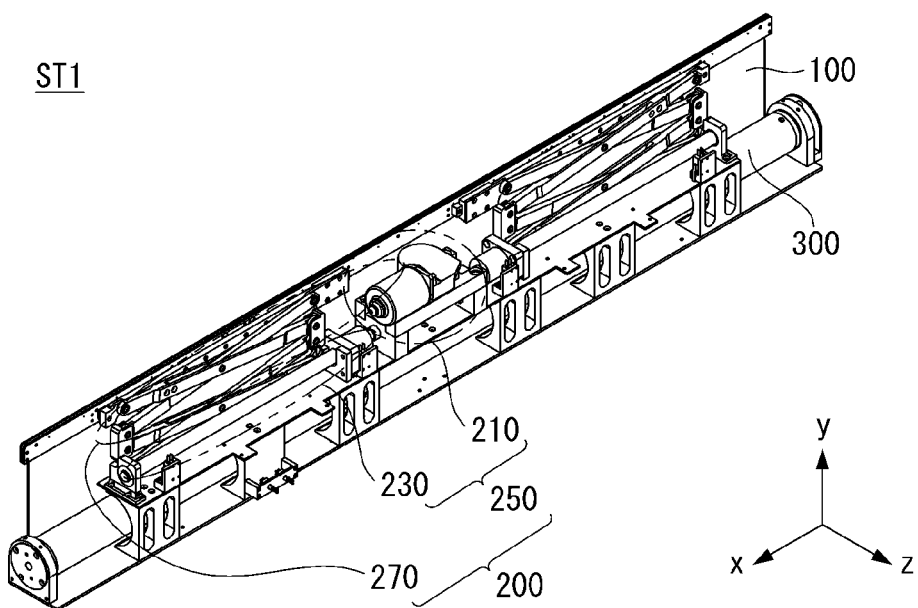
FIGS. 6A and 6B are perspective views illustrating an operation state of a rollable display device according to an aspect of the present disclosure.
Figure 6B:
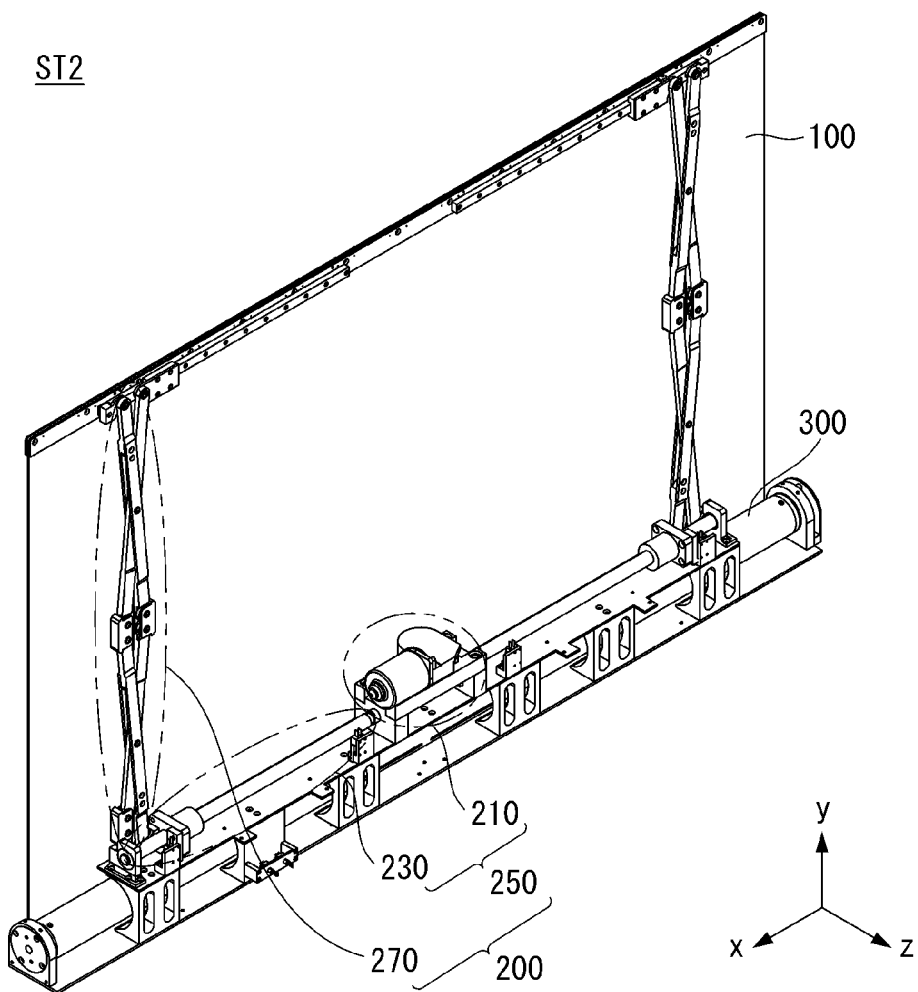
Figure 7:
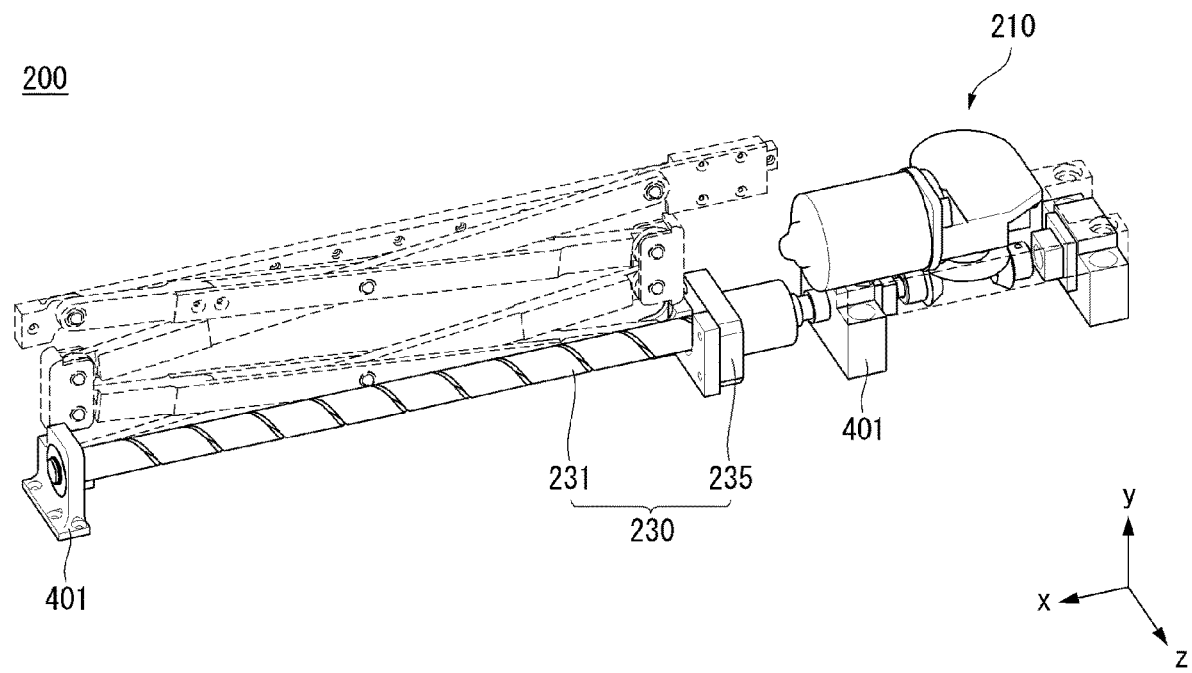
FIG. 7 is a view illustrating a driving unit of a support assembly.
Figure 8A:
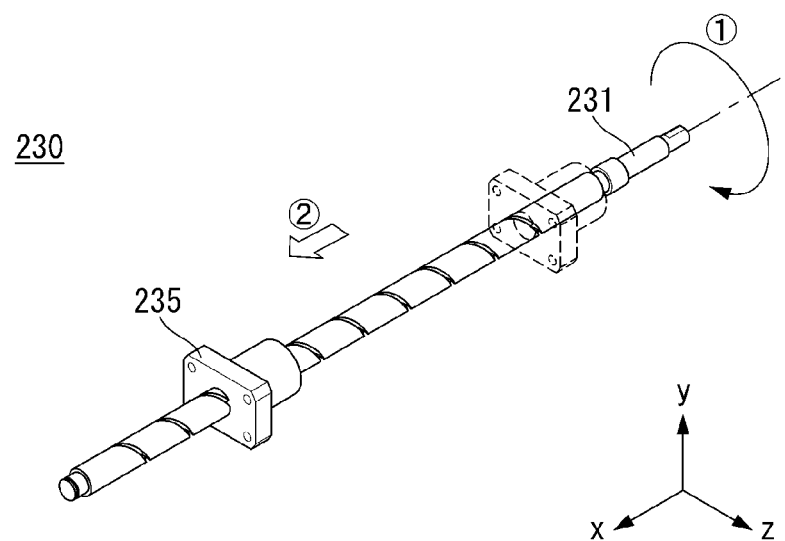
FIGS. 8A and 8B are views respectively illustrating a structure and an operation state of a motion converting unit.
Figure 8B:
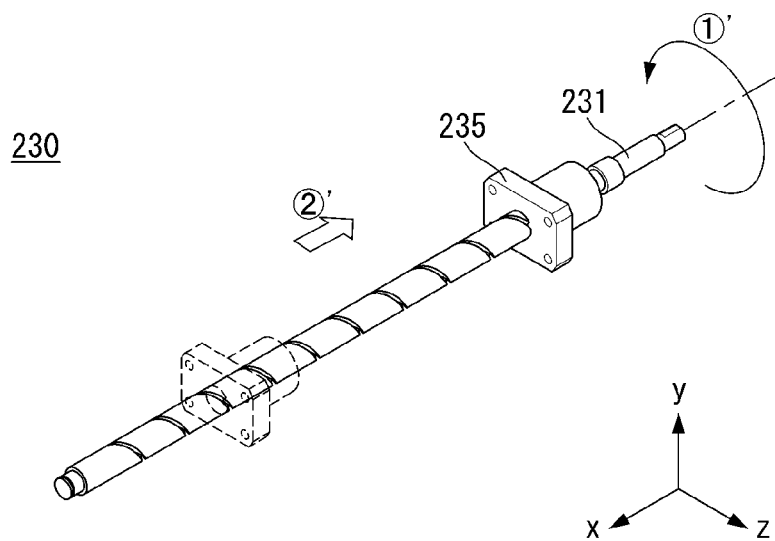
Figure 9:
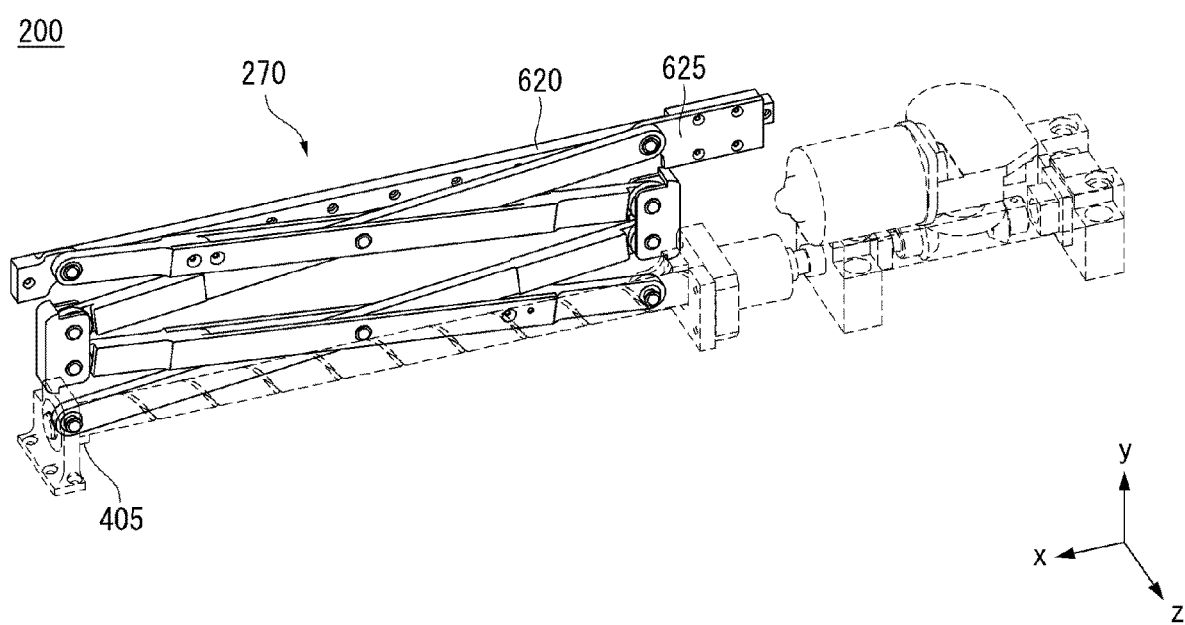
FIG. 9 is a view illustrating a lifting unit of a support assembly.
Figure 10A:
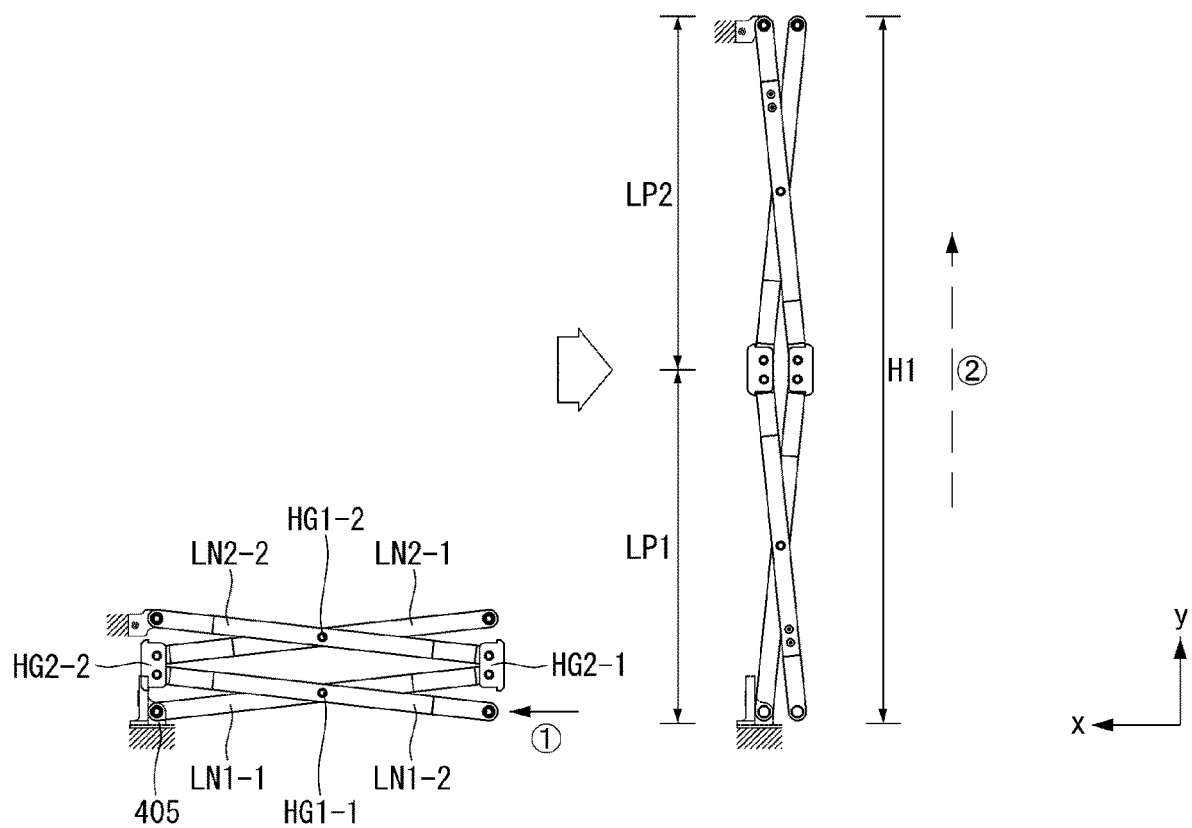
FIGS. 10A, 10B and 11 are views illustrating a structure and an operation state of a motion converting unit.
Figure 10B:
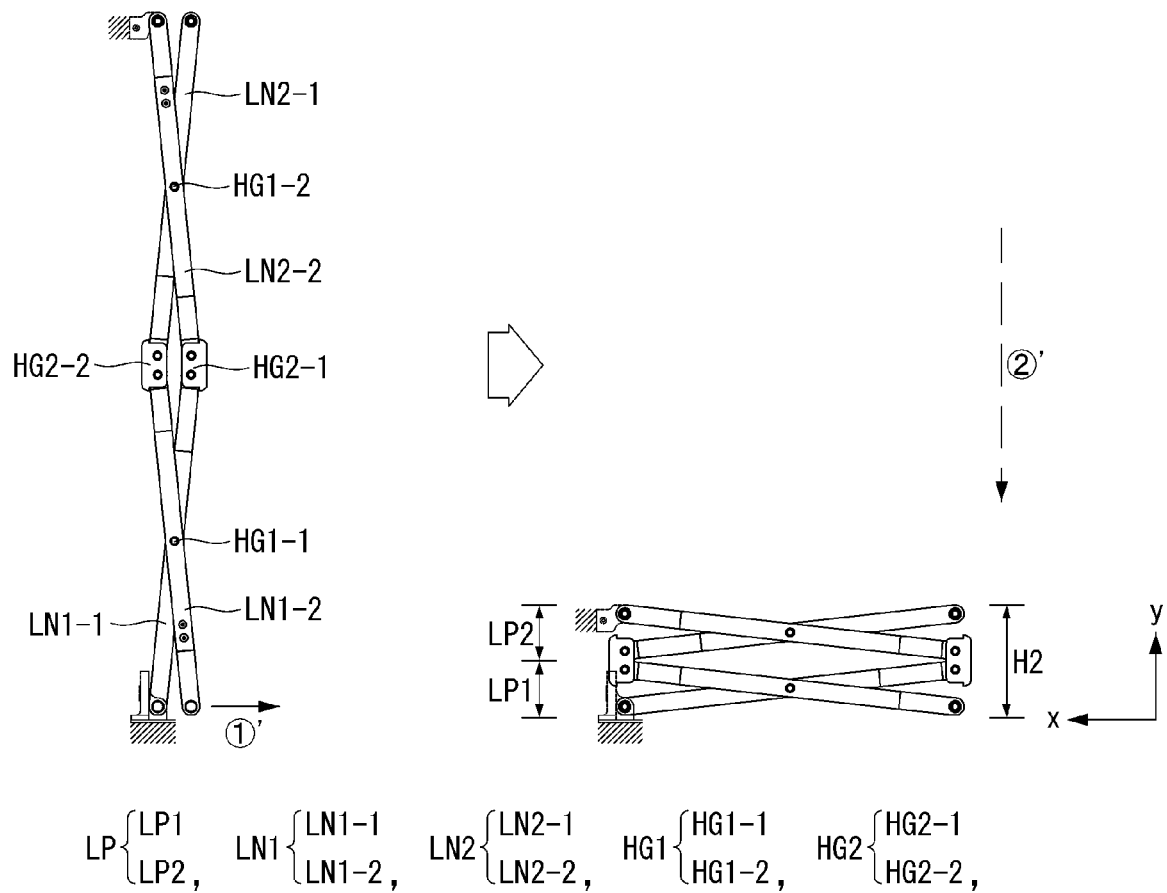
Figure 11:
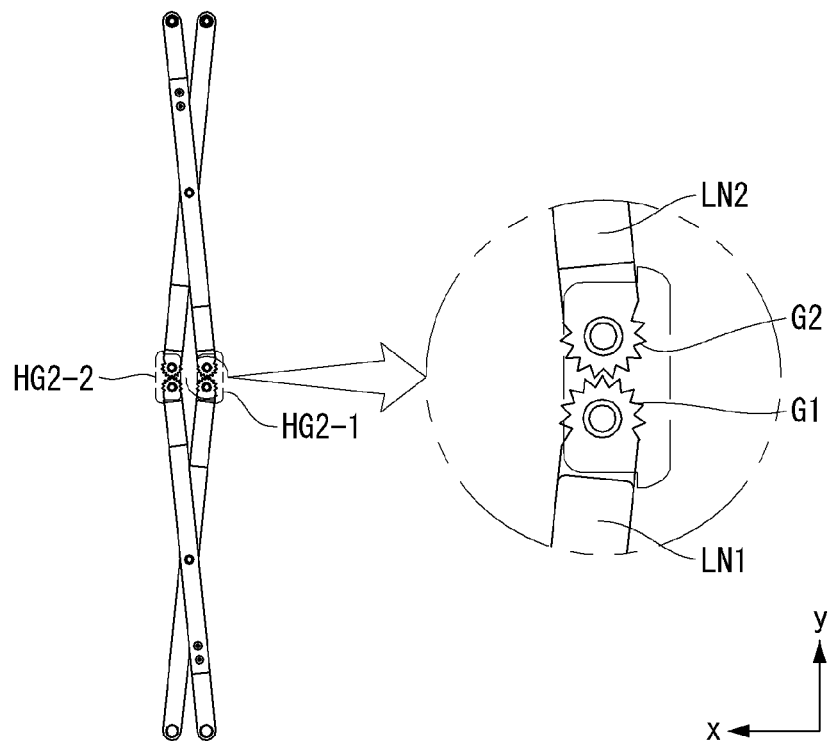
Figure 12:
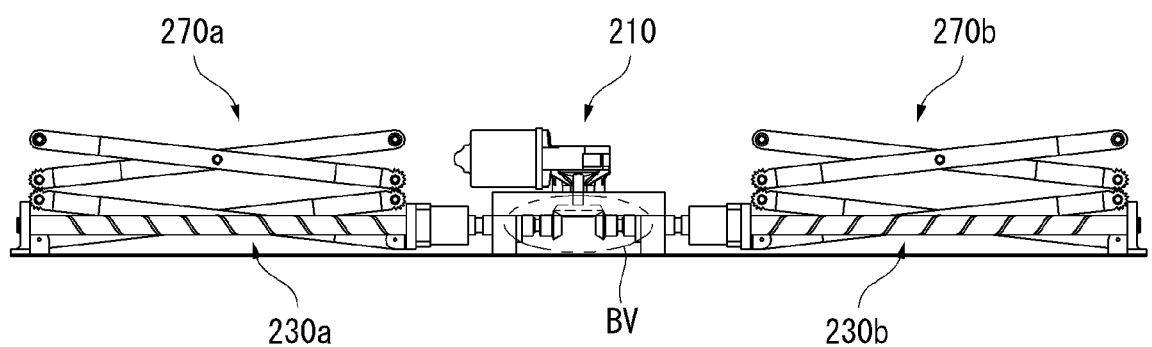
FIG. 12 is a view illustrating an example of driving of a driving unit.

Hereinafter, referring to FIGS. 5 to 12, a rollable display device according to a first aspect of the disclosure will be described. FIG. 5 is a perspective view illustrating a rollable display device according to an aspect of the disclosure. FIGS. 6A and 6B are perspective views illustrating an operation state of a rollable display device according to an aspect of the disclosure. FIG. 7 is a view illustrating a driving unit of a support assembly. FIGS. 8A and 8B are views illustrating a structure and an operation state of a motion converting unit. FIG. 9 is a view illustrating a lifting unit of a support assembly. FIGS. 10A, 10B and 11 are views illustrating a structure and an operation state of a motion converting unit. FIG. 12 is a view illustrating an example of driving of a driving unit.

Referring to FIGS. 5, 6A and 6B, the rollable display device according to an aspect of the disclosure includes a display panel 100, a support assembly 200, and a panel roller unit 300.

The display panel 100 may have a square or rectangular planar shape, but is not limited thereto. For example, the planar shape of the display panel 100 may be irregular shape (or a free form shape) including a circle.

Hereinafter, a width direction (for example, an x-axis direction) of the display panel 100 is defined as a first direction, a longitudinal direction (for example, a y-axis direction) of the display panel 100 is defined as a second direction, and a thickness direction (for example, a z-axis direction) of the display panel 100 is defined as a third direction.

The display panel 100 can be rolled or unrolled, and can maintain a first state ST1 and a second state ST2 as shown in FIGS. 6A and 6B. The display panel 100 may be changed from the first state ST1 to the second state ST2 or from the second state ST2 to the first state ST1 as necessary. The first state ST1 indicates a state in which the display panel 100 is rolled. Since a display area of the display panel 100 is not exposed to outside in the first state ST1, the first state ST1 may be a state in which a user can not recognize the display area from outside. In the first state ST1, the rollable display device may be turned off so that no input image is displayed.

The second state ST2 indicates a state in which the display panel 100 is unrolled. In the second state ST2, the display panel 100 can maintain a substantially flat shape. The second state ST2 may be a state in which the user can recognize the display area of the display panel 100 from outside and be provided with necessary information. In the second state ST2, the rollable display device may be turned on so that the input image is displayed.

Although not shown, a back cover may be further provided on a back surface of the display panel 100. The back cover supports the back surface of the display panel 100 and reinforces rigidity of the display panel 100. That is, an aspect of the disclosure can improve physical durability of the display panel 100 by further including the back cover. The back cover may include a lightweight and high-strength material. For example, the back cover may be formed of one of glass fiber reinforced plastics (GFRP), carbon fiber reinforced plastics (CFRP), aluminum, and plastic.

The support assembly 200 includes a driving unit 250 and a lifting unit 270. An aspect of the disclosure can support the unrolled display panel 100 on the back surface of display panel 100 and maintain a flat state of display panel 100 by having the support assembly 200. Thus, there is an advantage that usability of the rollable display device can be improved.

Referring to FIGS. 7, 8A and 8B, the driving unit 250 includes a motor 210 and a motion converting unit 230. The motor 210 may be fixed at a predetermined position of a base member 510. The motor 210 is connected to a power generator such as an external power source or an embedded battery and can receive power. The motor 210 generates a rotational force to provide a driving force (i.e., rotational force) to the motion converting unit 230.

The motion converting unit 230 is connected to the motor 210 and is configured to convert a rotational motion of the motor 210 into a linear reciprocating motion in the first direction. For example, the motion converting unit 230 may be implemented as a shaft (or a screw) 231 and a ball screw including a nut (or a ball nut) 235 which is coupled to the shaft 231.

The shaft 231 receives the rotational force from the motor 210 and performs a rotational motion with reference to a rotation axis extending along the first direction. The nut 235 coupled to the shaft 231 performs a linear reciprocating motion corresponding to a rotation direction of the shaft 231.

One end of the shaft 231 is coupled to be rotatable to a shaft bracket 401 fixed on the base member 510. Therefore, the movement of the shaft 231 other than the rotational motion with respect to the rotation axis can be restricted. That is, the shaft 231 has a degree of freedom in the rotation direction with respect to the rotation axis. A bearing may be further provided between the shaft bracket 401 and the shaft 231 so that the rotational motion of the shaft 231 can be facilitated. The movement of the nut 235 other than the linear reciprocating motion in the first direction can be restricted. That is, the nut 235 has a degree of freedom in the first direction.

For example, as shown in FIGS. 8A and 8B, when the shaft 231 rotates in a forward direction (①), the nut 235 can be linearly moved in +x-axis direction (②). When the shaft 231 rotates in a reverse direction (①'), the nut 235 can be linearly moved in −x-axis direction (②'). The direction of linear motion of the nut 235 corresponding to the rotation direction of the shaft 231 can be determined depending on a direction in which a screw groove between the shaft 231 and the nut 235 is formed.

A limit sensor 630 (shown in FIG. 5) capable of restricting the movement of the nut 235 may be further provided on the base member 510. The limit sensor 630 is provided at a predetermined position and may restrict the movement of the nut 235 so that the nut 235 can move only within a predetermined interval. For example, a controller can control on/off of the motor 210 through a signal sensed through the limit sensor 630.

Referring to FIGS. 9 to 12, the lifting unit 270 is configured to move up and down the display panel 100 in conjunction with the linear motion of the motion converting unit 230. The lifting unit 270 is formed in a link structure and can repeatedly perform a folding or an unfolding operation by receiving a driving force from the motion converting unit 230. When the display panel 100 is in the first state ST1, the lifting unit 270 maintains a folded state. In other words, when the display panel 100 is in the first state ST1, the lifting unit 270 has a lowest height. When the display panel 100 is in the second state ST2, the lifting unit 270 maintains an unfolded state. In other words, when the display panel 100 is in the second state ST2, the lifting unit 270 has a highest height.

The lifting unit 270 may be implemented as a scissor lift structure. That is, the lifting unit 270 includes a link portion LP. The link portion LP includes a first link LN1 and a second link LN2. The first link LN1 and the second link LN2 intersect with each other to have scissor shape (or an 'X' shape) and are coupled to be rotatable via a first hinge HG1.

For example, the lifting unit 270 may include a first link portion LP1 and a second link portion LP2 arranged along a second direction. The first link portion LP1 includes a 1-1 link LN1-1 and a 1-2 link LN1-2. The 1-1 LN1-1 and the 1-2 link LN1-2 of the first link portion LP1 intersect with each other in a scissor shape and are coupled to be rotatable via a 1-1 hinge HG1-1.

One end of the 1-1 link LN1-1 is coupled to be rotatable to a hinge bracket 405 fixed on the base member 510. The 1-1 link LN1-1 has a degree of freedom in a rotation direction with respect to a rotation axis extending along the third direction. As shown in the figure, the hinge bracket 405 and the shaft bracket 401 may be formed as one body, but the aspect of the disclosure is not limited thereto.

One end of the 1-2 link LN1-2 is provided so as to be movable in conjunction with the linear motion of the motion converting unit 230. That is, the one end of the 1-2 link LN1-2 may be coupled to be rotatable to the nut 235 of the ball screw. Accordingly, the 1-2 link LN1-2 is rotatable with respect to a rotation axis extending along the third direction and is provided to be capable of linear reciprocating motion corresponding to the linear reciprocating motion of the nut 235. A rotational motion of the nut 235 can be limited by a coupled structure with the 1-2 link LN1-2. Accordingly, the nut 235 can perform the linear reciprocating motion without rotating in conjunction with the rotational motion of the shaft 231.

The second link portion LP2 includes a 2-1 link LN2-1 and a 2-2 link LN2-2. The 2-1 LN2-1 and the 2-2 link LN2-2 of the second link portion LP2 intersect with each other in a scissor shape and are coupled to be rotatable via a 1-2 hinge HG1-2.

The first link LN1 of the first link portion LP1 and the second link LN2 of the second link portion LP2 are coupled to be rotatable via a second hinge HG2. The second link LN2 of the first link portion LP1 and the first link LN1 of the second link portion LP2 are coupled to be rotatable via a second hinge HG2. A rotation axis of the first hinge HG1 and a rotation axis of the second hinge HG2 are parallel to each other.

The second hinge HG2 may be implemented as a spur gear. That is, the second hinge HG2 may be implemented in such a manner that a first gear G1 connected to the first link LN1 and a second gear G2 connected to the second link LN2 are engaged with each other. The first gear G1 and the second gear G2 have different rotation axes, and the rotation axes are parallel to each other. In an aspect of the disclosure, the second hinge HG2 is implemented in a form of the spur gear, so that driving stability and durability of the second hinge HG2 can be secured more than when the second hinge HG2 is implemented to have one rotation axis.

Other end of the 1-1 link LN1-1 and one end of the 2-2 link LN2-2 are coupled to be rotatable via a 2-1 hinge HG2-1, and other end of the 1-2 link LN1-2 and one end of the 2-1 link LN2-1 are coupled to be rotatable via a 2-2 hinge HG2-2.

Other end of the 2-2 link LN2-2 is coupled to be rotatable to one end of the display panel 100. The one end of the display panel 100 may be defined as an upper end of the display panel 100. The link 2-2 LN2-2 has a degree of freedom in a rotation direction with respect to a rotation axis extending along the third direction.

The display panel 100 may further include a head bar 600 (shown in FIG. 5) at the one end of the display panel, and the other end of the 2-2 link LN2-2 may be coupled to be rotatable to the head bar 600 fixed to the one end of the display panel 100. The head bar 600 has a predetermined rigidity. When the 2-2 link LN2-2 is directly coupled to the one end of the display panel 100, an external force due to a movement of the 2-2 link LN2-2 may be provided on the display panel 100 and damage may occur. An aspect of the disclosure further includes the head bar 600, thereby alleviating the external force that can be provided on the display panel 100, and minimizing damage to the display panel 100.

The head bar 600 includes a slide rail 620. The slide rail 620 has a predetermined tracking path extending in the first direction. The slide rail 620 determines a movement path of the 2-1 link LN2-1 in the first direction. Other end of the 2-1 link LN2-1 is coupled to be rotatable to the slide rail 620 and its movement is guided along the tracking path of the slide rail 620. The other end of the 2-1 link LN2-1 is coupled to a slider 625 to be movable along the slide rail 620 and can move along the tracking path of the slide rail 620.

The lifting unit 270 can move up and down the display panel 100 in conjunction with the linear motion from the motion converting unit 230. That is, the one end of the 1-1 link LN1-1 is coupled to the hinge bracket 405 to fix the movement in the first direction, the one end of the 1-2 link LN1-2, which receives a driving force from the nut 235, performs a linear reciprocating motion in the first direction corresponding to the linear reciprocating motion of the nut 235 in the first direction. Accordingly, in response to the linear reciprocating motion of the 1-2 link LN1-2 in the first direction, the one end of the 1-1 link LN1-1 and the one end of the 1-2 link LN1-2 may be spaced apart from or adjacent to each other in the first direction. As the one end of the 1-1 link LN1-1 and the one end of the 1-2 link LN1-2 are disposed to be adjacent to each other, the lift unit 270 is unfolded. On the contrary, as the one end of the 1-1 link LN1-1 and the one end of the 1-2 link LN1-2 are spaced apart, the lift unit 270 is folded. The one end of the display panel 100 can ascend and descend in the second direction corresponding to a height change of the lift unit 270.

Specifically, the one end of the 1-2 link LN1-2 is moved in the +x-axis direction in conjunction with the nut 235 moving in the +x-axis direction (①) and is disposed to be gradually adjacent to the one end of the 1-1 link LN1-1. Correspondingly, the 1-1 link LN1-1 and the 1-2 link LN1-2 are rotated via the 1-1 hinge HG1-1, and the other end of the 1-1 link LN1-1 and the other end of the 1-2 link LN1-2 are disposed to be gradually adjacent to each other. Correspondingly, the one end of the 2-2 link LN2-2 coupled to the other end of the 1-1 link LN1-1 and the one end of the 2-1 link LN2-1 coupled to the other end of the 1-2 link LN1-2 are disposed to be gradually adjacent to each other. Correspondingly, the 2-1 link LN2-1 and the 2-2 link LN2-2 are rotated via the 1-2 hinge HG1-2, and the other end of the 2-1 link LN2-1 and the other end of the 2-2 link LN2-2 are disposed to be gradually adjacent to each other. At this time, the other end of the 2-1 link LN2-1 slides in the +x-axis direction along the tracking path of the slide rail 620 and is disposed to be gradually adjacent to the other end of the 2-2 link LN2-2. Accordingly, an overall height H1 of the lifting unit 270 including the first link portion LP1 and the second link portion LP2 is increased (②). The one end of the display panel 100 ascends corresponding to the height of the lifting unit 270.

Conversely, the one end of the 1-2 link LN1-2 is moved in the −x-axis direction in conjunction with the nut 235 moving in the −x-axis direction (①′) and is gradually spaced apart from the one end of the 1-1 link LN1-1. Correspondingly, the 1-1 link LN1-1 and the 1-2 link LN1-2 are rotated via the 1-1 hinge HG1-1, and the other end of the 1-1 link LN1-1 and the other end of the 1-2 link LN1-2 are gradually spaced apart from each other. Correspondingly, the one end of the 2-2 link LN2-2 coupled to the other end of the 1-1 link LN1-1 and the one end of the 2-1 link LN2-1 coupled to the other end of the 1-2 link LN1-2 are gradually spaced apart from each other. Correspondingly, the 2-1 link LN2-1 and the 2-2 link LN2-2 are rotated via the 1-2 hinge HG1-2, and the other end of the 2-1 link LN2-1 and the other end of the 2-2 link LN2-2 are gradually spaced apart from each other. At this time, the other end of the 2-1 link LN2-1 slides in the −x-axis direction along the tracking path of the slide rail 620 and is gradually spaced apart from the other end of the 2-2 link LN2-2. Accordingly, an overall height H2 of the lifting unit 270 including the first link portion LP1 and the second link portion LP2 is decreased (②′). The one end of the display panel 100 descends corresponding to the height of the lifting unit 270.

An aspect of the disclosure uses a driving element such as a ball screw extending in the first direction to provide a driving force for driving the lifting unit 270. In this instance, an area occupied by the driving element in the second direction can be minimized. Therefore, it is possible to minimize the area occupied by the driving element in a state in which the lifting unit 270 is folded.

Further, an aspect of the disclosure uses a driving element such as a ball screw that can convert the rotational motion of the motor 210 into a linear motion to provide a driving force to the lifting unit 270. Accordingly, a relatively strong driving force can be generated even in a narrow space, and a load applied to the driving unit 250 can be minimized. Since it is possible to provide the driving force required for the lifting unit 270 with output of the relatively small motor 210, noise and power consumption of the motor 210 for driving the lifting unit 270 can be reduced. Since the motor 210 having a relatively small size can be used, a compact design can be realized.

Although not shown, the lifting unit 270 may include only one link portion LP having a first link LN1 and a second link LN2. In this instance, one end of the first link LN1 is coupled to be rotatable to the hinge bracket 405, other end of the first link LN1 is coupled to be rotatable to the slide rail 620 so as to be guided along the tracking path of the slide rail 620, one end of the second link LN2 is coupled to be rotatable so as to be linearly movable corresponding to the linear reciprocating motion of the motion converting unit 230, and other end of the second link LN2 may be coupled to be rotatable to one end of the display panel 100.

An aspect of the disclosure can minimize a driving force required to drive the lifting unit 270 by reducing the number of link portions LP constituting the lifting unit 270. Since the motor 210 having a relatively small size can be used, a compact design can be realized. Power consumption for driving the lifting unit 270 can be reduced, and the relatively small motor 210 can be used, thereby realizing a compact design.

In addition, an aspect of the disclosure reduces the number of link portions LP constituting the lifting unit 270 so that an area in the second direction occupied by the lifting unit 270 can be reduced when the lifting unit 270 is folded. Therefore, it is possible to reduce the area occupied by the lifting unit 270 in a state in which the lifting unit 270 is folded.

Although not shown, one or more auxiliary link portions may be further provided between the first link portion LP1 and the second link portion LP2. In this instance, the auxiliary link portion is arranged in order along the second direction between the first link portion LP1 and the second link portion LP2, and may be coupled to be rotatable to a neighboring link portion LP and/or a neighboring other auxiliary link portion via the second hinge HG2.

The lifting unit 270 of the support assembly 200 supports the display panel 100 from the back side and restrains and restricts shaking and torsion in all directions of the unrolled display panel 100. Thus, an unrolled portion of the display panel 100 can be maintained in a flat state unless a direct physical force is applied thereto.

Referring to FIG. 12, the lifting units 270a and 270b may be provided on the left and right sides of the display panel 100, respectively. That is, an aspect of the disclosure may include a plurality of lifting units 270a and 270b as necessary. The lifting units 270a and 270b may be selectively provided at appropriate positions to avoid mechanical interference with other structures located on the back surface of the display panel 100. That is, it means that the degree of design freedom can be improved unlike an instance when only one lifting unit 270 is provided, the lifting unit 270 must be disposed at a center of the display panel 100.

In order to drive the lifting units 270, it is necessary to provide a corresponding number of motion converting units 230. That is, in order to drive a first lifting unit 270a and a second lifting unit 270b that respectively cover the left and right sides of the display panel 100, a first motion converting unit 230a and a second motion converting unit 230b may be provided, respectively.

The first motion converting unit 230a and the second motion converting unit 230b may be driven by using one motor 210. In an aspect of the disclosure, the first motion converting unit 230a and the second motion converting unit 230b are driven by using one motor 210 so that the first lifting unit 270a and the second lifting unit 270b can be synchronized with each other. That is, in an aspect of the disclosure, the first motion converting unit 230a and the second motion converting unit 230b are simultaneously driven by using one motor 210 so that it is possible to prevent a deviation in the moving positions of the first lifting unit 270a and the second lifting unit 270b. Therefore, there is an advantage that driving stability and product reliability of the rollable display device can be secured.

A connection between the motion converting unit 230 and the motor 210 may be implemented as a bevel gear BV. That is, the shafts 231 of the first motion converting unit 230a and the second motion converting unit 230b can receive a driving force from the motor 210 using a structure of the bevel gear BV. Rotation axes of gears connected to the shaft 231 of the first motion converting unit 230a and the shaft 231 of the second motion converting unit 230b are parallel to each other, and gears connected to the motor 210 intersect with the rotation axes of the gears connected to the shafts 231.

Since an aspect of the disclosure uses the motion converting unit 230 such as a ball screw, the driving force for driving the lifting unit 270 can be relatively reduced. Therefore, it is easy to drive a plurality of motion converting units 230 by using one motor 210.

The panel roller unit 300 may be fixed to other end of the display panel 100. The other end of the display panel 100 may be defined as a lower end of the display panel 100. The panel roller unit 300 may be rotatable about a rotation axis extending in the first direction. Accordingly, the display panel 100 can be rolled and unrolled along a periphery of the panel roller portion 300.

The panel roller unit 300 may have a cylindrical shape. That is, a cross-sectional shape of the panel roller unit 300 may be circular. However, an aspect of the disclosure is not limited thereto. The panel roller unit 300 may be formed in any shape as long as the display panel 100 can easily be rolled and unrolled.

The operation of rolling and unrolling the display panel 100 along the periphery of the panel roller unit 300 can be mechanically controlled. The control operation can be implemented by the support assembly 200. That is, the display panel 100 can be rolled and unrolled along the periphery of the panel roller unit 300 in conjunction with the folding operation of the lifting unit 270.

For example, when the lifting unit 270 of the support assembly 200 is unfolded, the display panel 100 is unrolled from the panel roller unit 300. That is, one end of the display panel 100 rises when the lifting unit 270 is unfolded, and the display panel 100 is unrolled from the panel roller unit 300 correspondingly. The back surface of the unrolled display panel 100 is supported by the lifting unit 270 of the support assembly 200 to maintain its flat state. Conversely, when the lifting unit 270 is folded, the display panel 100 is rolled along the periphery of the panel roller unit 300. That is, the one end of the display panel 100 is lowered when the lifting unit 270 is folded, the display panel 100 is rolled along the periphery of the panel roller unit 300 in response thereto.

Although not shown, an aspect of the disclosure may further include a torsion spring capable of applying a predetermined tension to the display panel 100 so that the display panel 100 is smoothly rolled and unrolled. The torsion spring can provide a restoring force to the panel roller unit 300 so that the panel roller unit 300 can be restored to the original state.

Although not shown, the panel roller unit 300 can be driven by a driving device such as a motor 210. The driving device may be a tubular motor, and may be provided in the panel roller unit 300. The driving device can convert electrical energy into mechanical energy in synchronization with a signal from a controller, and can supply the mechanical energy to the panel roller unit 300. The driving device may be in conjunction with the driving unit 250 of the support assembly 200 in synchronization with a control signal from the controller.

An aspect of the disclosure may further include a housing 550 (shown in FIG. 5). There is an internal space for accommodating the panel roller unit 300 inside the housing 550. The housing 550 further includes a lead-in portion that opens the internal space. The display panel 100, which is rolled and unrolled to the panel roller unit 300, can be drawn in and out through the lead-in portion. A base member 510 having a support assembly 200 may be disposed on the housing 550. The housing 550 and the base member 510 may be formed as one body, but are not limited thereto.

FIG. 13 is a view illustrating a rollable display device according to another aspect of the disclosure.

Figure 13A:
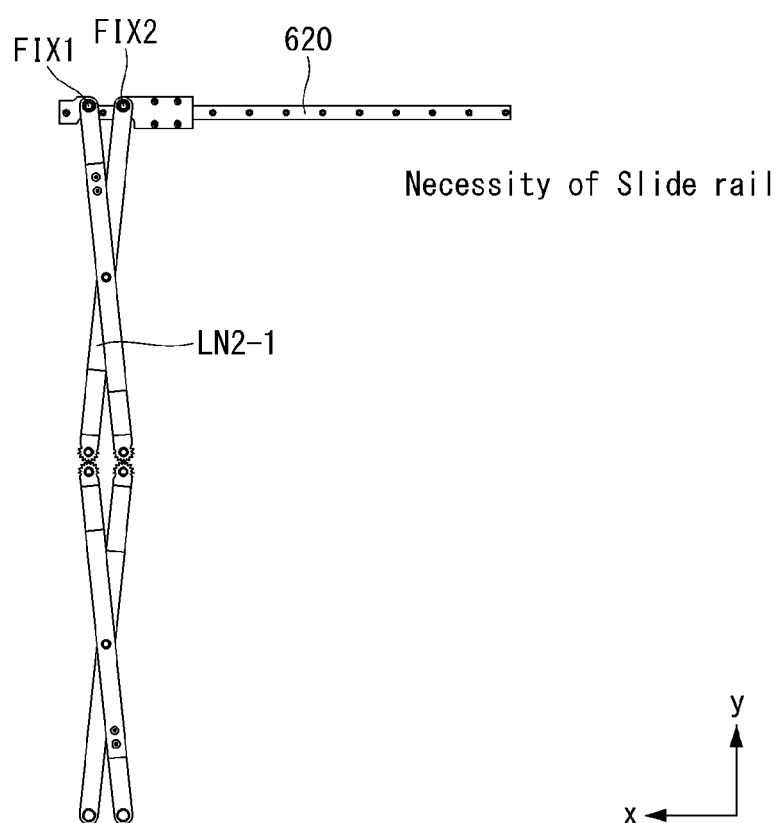
FIGS. 13A and 13B are views illustrating a rollable display device according to another aspect of the present disclosure.

Referring to FIG. 13A, in an aspect of the disclosure, there are two fixing points FIX1 and FIX2 at which one end of a lifting unit 270 and one end of the display panel 100 are coupled to each other. In this instance, one FIX1 of the fixing points FIX1 and FIX2 needs to be provided to be slidable along a slide rail 620.

Figure 13B:
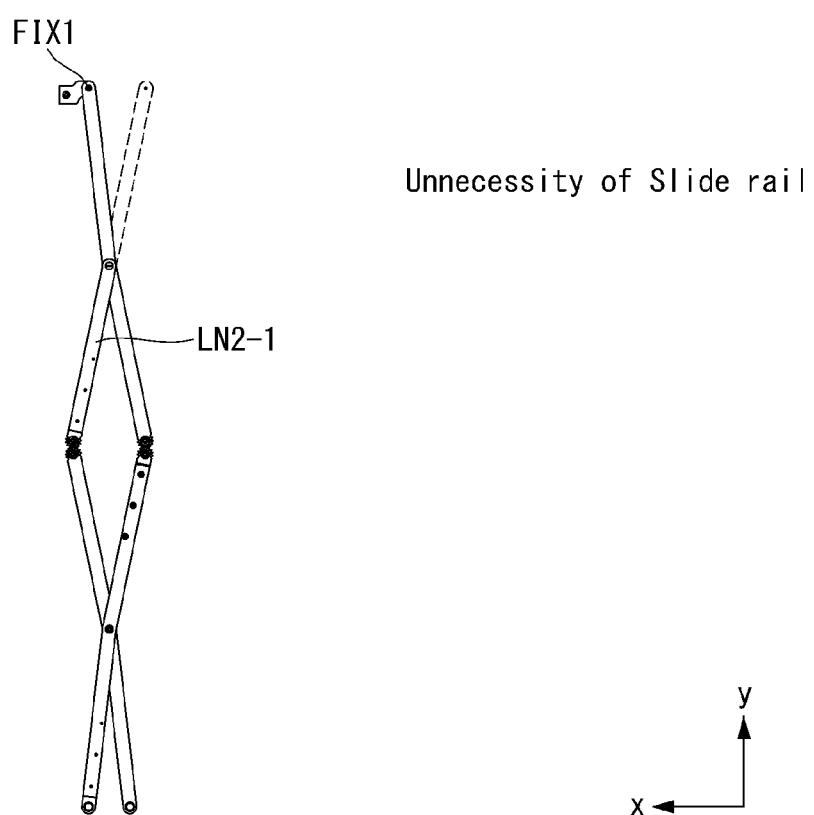

Referring to FIG. 13B, in another aspect of the disclosure, the rollable display device can be implemented as a simple structure in which the slide rail 620 is removed by reducing the number of the fixing point FIX1 at which one end of the lifting unit 270 and one end of the display panel 100 are coupled to each other. For example, in another aspect of the disclosure, the slide rail 620 can be removed by not coupling the other end of a 2-1 link LN2-1 to one end of the display panel 100 or removing the other end of the 2-1 link LN2-1.

Another aspect of the disclosure can implement the rollable display device with a simpler structure. Therefore, another aspect of the disclosure has an advantage that a more compact design can be implemented. Further, manufacturing cost and manufacturing time can be shortened, manufacturing defect can be reduced, and manufacturing yield can be improved.

Figure 14A:
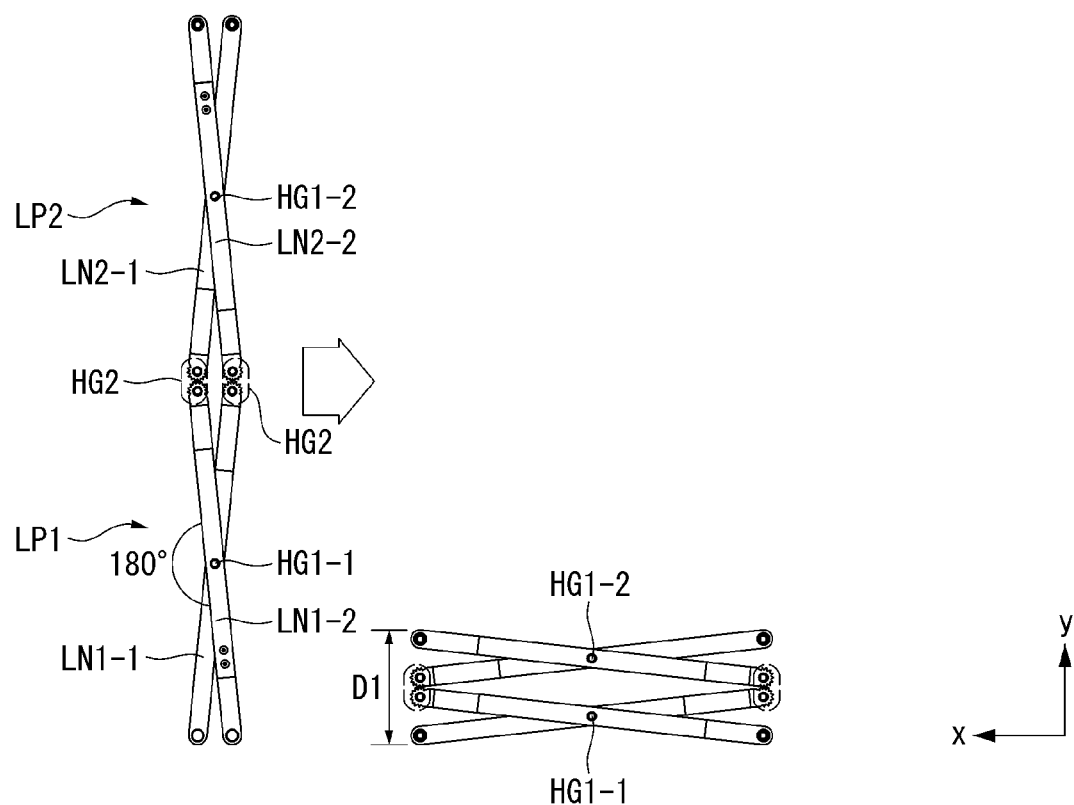
FIGS. 14A and 14B are views illustrating a rollable display device according to still another aspect of the disclosure.
Figure 14B:
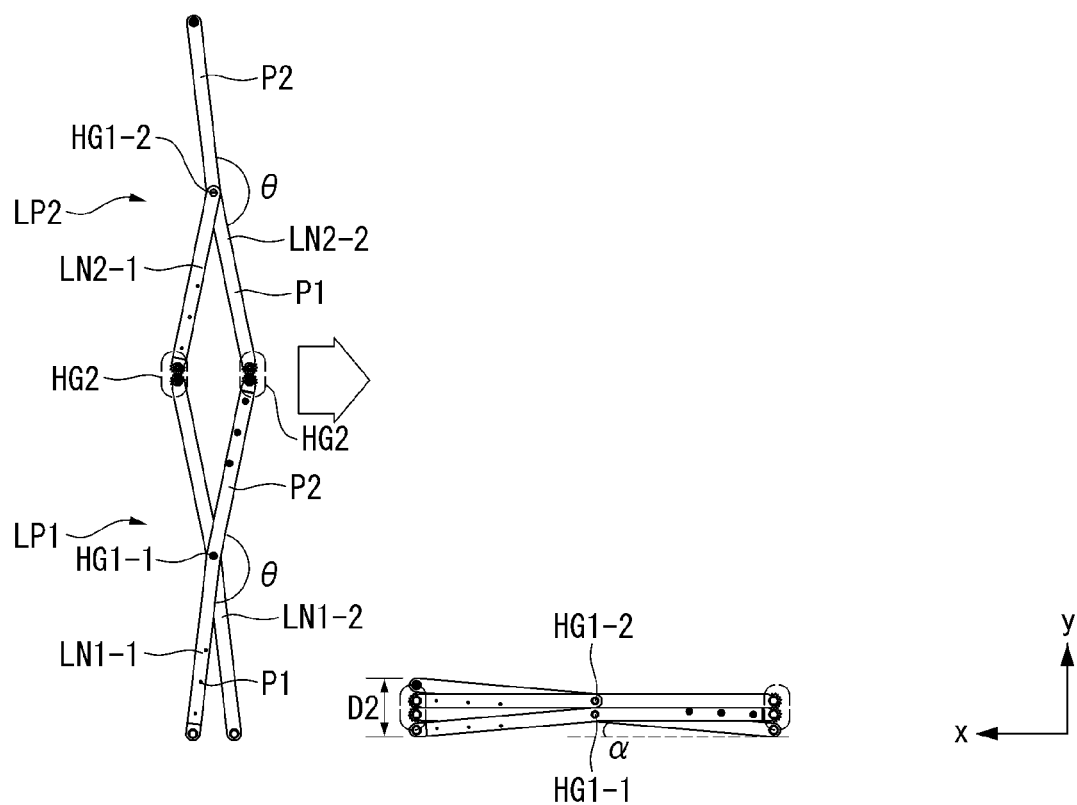

FIGS. 14A and 14B are views illustrating a rollable display device according to still another aspect of the present disclosure.

Referring to FIG. 14A, when a second hinge HG2 coupling a first link portion LP1 and a second link portion LP2 is implemented as a gear, there is a limit in folding the lifting unit 270 so that a 1-1 hinge HG1-1 of the first link portion LP1 and a 1-2 hinge HG1-2 of the second link portion LP2 are disposed adjacent to each other. Therefore, in a folded state of the lifting unit 270, an area D1 occupied by the lifting unit 270 in the second direction is relatively wide.

Referring to FIG. 14B, still another aspect of the disclosure is characterized in that links LN1 and LN2 constituting the first link portion LP1 and/or the second link portion LP2 have a bent shape. The bending directions of the links LN1 and LN2 constituting each link portion LP are the same, and the bending directions of links LN1-1 and LN1-2 constituting the first link portion LP1 and links LN2-1 and LN2-2 constituting the second link portion LP2 are different.

A first link LN1 and a second link LN2 may include a first portion P1 and a second portion P2, respectively. The first portion P1 and the second portion P2 each may be a portion extending in a reverse direction with respect to a first hinge HG1. The first portion P1 and the second portion P2 may have a predetermined angle. That is, the first link LN1 and the second link LN2 do not extend in parallel and may be bent at a predetermined angle.

For example, the 1-1 link LN1-1 and the 1-2 link LN1-2 of the first link portion LP1 may be bent upward. In other words, the 1-1 link LN1-1 and the 1-2 link LN1-2 of the first link portion LP1 may be bent upward convexly. The 2-1 link LN2-1 and the 2-2 link LN2-2 of the second link portion LP2 may be bent downward. In other words, the 2-1 link LN2-1 and the 2-2 link LN2-2 of the second link portion LP2 may be bent downward convexly.

In still another aspect of the disclosure, by bending the links LN1 and LN2 constituting the first link portion LP1 and the second link portion LP2 according to above-mentioned conditions, even when the second hinge HG2 coupling the first link portion LP1 and the second link portion LP2 is implemented as a gear, the lifting unit 270 can be folded until the 1-1 hinge HG1-1 of the first link portion LP1 and the 1-2 hinge HG1-2 of the second link portion LP2 are disposed adjacent to each other. In this instance, an area D2 occupied by the lifting unit 270 in the second direction can be minimized in the state in which the lifting unit 270 is folded. Therefore, it is possible to minimize the area occupied by the lifting unit 270 in the state in which the lifting unit 270 is folded.

On the other hand, since the 1-1 link LN1-1 and the 1-2 link LN1-2 of the first link portion LP1 may be bent upward, the 1-1 link LN1-1 and the 1-2 link LN1-2 are not arranged in parallel along the first direction and have a predetermined angle α in the state in which the lifting unit 270 is completely folded. Accordingly, the lifting unit 270 can be smoothly unfolded by receiving a driving force in the first direction. That is, since the links LN1-1 and LN1-2 located at the lowermost end maintain a predetermined angle α even when the lifting unit 270 is completely folded, it can be easy to receive the driving force from the first direction and transmit it to the second direction.

Although aspects have been described with reference to a number of illustrative aspects thereof, it should be understood that numerous other modifications and aspects can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A rollable display device comprising:
a display panel;
a motor generating a rotational motion;
first and second motion converting units configured to convert the rotational motion into a linear motion in a first direction and disposed at side portions, respectively, of the motor;
first and second lifting units configured to move up and down the display panel in conjunction with the linear motion of the first and second motion converting units, respectively, in a second direction; and
a bevel gear configured to connect between the motor and the motion converting units;
wherein the first motion converting unit includes:
a first shaft receiving the rotational motion; and
a first nut coupled to the first shaft and generating the linear motion in the first direction corresponding a rotation direction of the first shaft, and
wherein the second motion converting unit includes:
a second shaft receiving the rotational motion; and
a second nut coupled to the second shaft and generating the linear motion in the first direction corresponding a rotation direction of the second shaft.

2. The rollable display device of claim 1, wherein one end of the first shaft coupled to a first shaft bracket, and one end of the second shaft coupled to a second shaft bracket.

3. The rollable display device of claim 2, further comprising a first bearing provided between the first shaft and the first shaft bracket and a second bearing provided between the second shaft and the second shaft bracket.

4. The rollable display device of claim 1, further comprising first and second limit sensors configured to restrict a movement of the first and second nuts, respectively.

5. The rollable display device of claim 1, wherein the first and second lifting units are spaced apart from each other in the first direction.

6. The rollable display device of claim 1, wherein the first and second motion converting units to drive the first and second lifting units, respectively.

7. The rollable display device of claim 1, wherein the first and second motion converting units are simultaneously driven by using only one motor such that the first and second lifting units are synchronized with each other.

8. The rollable display device of claim 1, further comprising a head bar fixed to one end of the display panel and coupled to the first and second lifting units.

9. A rollable display device comprising:
a display panel;
a motor generating a rotational motion;
first and second motion converting units configured to convert the rotational motion into a linear motion in a first direction and disposed at side portions, respectively, of the motor;
first and second lifting units configured to move up and down the display panel in conjunction with the linear motion of the first and second motion converting units, respectively, in a second direction; and
a head bar fixed to one end of the display panel and coupled to the first and second lifting units,
wherein the first motion converting unit includes:
a first shaft receiving the rotational motion; and
a first nut coupled to the first shaft and generating the linear motion in the first direction corresponding a rotation direction of the first shaft, and
wherein the second motion converting unit includes:
a second shaft receiving the rotational motion; and
a second nut coupled to the second shaft and generating the linear motion in the first direction corresponding a rotation direction of the second shaft.

10. The rollable display device of claim 9, further comprising a bevel gear configured to connect between the motor and the first and second motion converting units.

11. The rollable display device of claim 9, wherein one end of the first shaft coupled to a first shaft bracket, and one end of the second shaft coupled to a second shaft bracket.

12. The rollable display device of claim 9, further comprising a first bearing provided between the first shaft and the first shaft bracket and a second bearing provided between the second shaft and the second shaft bracket.

13. The rollable display device of claim 9, further comprising first and second limit sensors configured to restrict a movement of the first and second nuts, respectively.

14. The rollable display device of claim 9, wherein the first and second lifting units are spaced apart from each other in the first direction.

15. The rollable display device of claim 9, wherein the first and second motion converting units drive the first and second lifting units, respectively.

16. The rollable display device of claim 9, wherein the first and second motion converting units are simultaneously driven by using only one motor such that the first and second lifting units are synchronized with each other.

17. The rollable display device of claim 1, wherein the bevel gear includes a first gear connected to the motor, a second gear connected to the first shaft and a third gear connected to the second shaft, and
wherein a rotation axis of the first gear intersects with rotation axes of the second and third gears, and the rotation axes of the second and third gears are parallel to each other.

* * * * *